United States Patent [19]

Gee et al.

[11] 3,987,561
[45] Oct. 26, 1976

[54] AUGER MOUNTING FOR AUGER SCRAPER

[75] Inventors: James Edgar Gee, Washington; Robert Norris Stedman, Chillicothe, both of Ill.

[73] Assignee: Caterpillar Tractor Co., Peoria, Ill.

[22] Filed: Nov. 3, 1975

[21] Appl. No.: 628,023

[52] U.S. Cl. .............................. 37/8; 214/83.32; 198/657; 299/87
[51] Int. Cl.² ........................................ B60P 1/42
[58] Field of Search .................. 37/4, 7, 8, 9, 43 U; 172/532; 214/83.32; 198/213, 214; 277/92; 299/87

[56] References Cited
UNITED STATES PATENTS

| | | | |
|---|---|---|---|
| 1,273,757 | 7/1918 | Fanger | 198/213 X |
| 1,922,023 | 8/1933 | Baer | 198/213 |
| 2,449,240 | 9/1948 | Martin | 198/213 |
| 3,180,648 | 4/1965 | Kupfert et al. | 277/92 |
| 3,529,840 | 9/1970 | Durham et al. | 277/92 |
| 3,670,913 | 6/1972 | Reaves | 214/83.32 X |
| 3,738,028 | 6/1973 | Reinhardt | 214/83.32 X |
| 3,812,607 | 5/1974 | Fenske | 214/83.32 X |
| 3,857,190 | 12/1974 | Gee et al. | 37/8 |
| 3,863,367 | 2/1975 | Gee et al. | 198/213 |
| 3,888,544 | 6/1975 | Bennett | 299/87 X |

FOREIGN PATENTS OR APPLICATIONS

| | | | |
|---|---|---|---|
| 162,023 | 7/1954 | Australia | 198/213 |
| 667,162 | 7/1963 | Canada | 198/214 |
| 1,054,013 | 3/1959 | Germany | 198/213 |

Primary Examiner—E. H. Eickholt
Attorney, Agent, or Firm—Wegner, Stellman, McCord, Wiles & Wood

[57] ABSTRACT

A self-loading auger scraper has a sealed auger supporting bearing assembly that includes a fixed lower housing secured to the floor of the scraper bowl and an upper housing rotatably mounted in bearings in the lower housing. An auger drive means is supported on a cross beam at the top of the bowl; and the upper bearing housing and the drive means have generally coaxial opposed square stub shafts which are loosely but non-rotatably engaged by square sockets in the bottom and top of an auger shaft to provide slip connections. The length of the auger shaft is such as to permit the auger to float while maintaining the slip connections.

15 Claims, 3 Drawing Figures

AUGER MOUNTING FOR AUGER SCRAPER

BACKGROUND OF THE INVENTION

Self-loading scrapers which are provided with a generally upright auger near the cutting edge of the scraper bowl are well known as disclosed in U.S. Pat. Nos. 3,857,190, 3,863,367, and a number of earlier patents. The auger helps to prevent jamming of material in the front of the bowl by moving some of it upwardly so that it may fall behind the auger. Such augers commonly have a shaft mounted in a bearing at the bottom of the bowl, while there is a driving connection between the upper end of the auger shaft and an auger drive means which is mounted upon a cross beam at the top of the bowl as disclosed in said U.S. Pat. No. 3,863,367.

The supporting bearing assembly for the auger in a self-loading scraper bowl operates in an extremely dirty environment, where it is constantly subjected to the action of masses of moving material that varies from the finest soil, which may be either powder dry or suspended in water, to rocks and boulders. Accordingly, a conventional seal of the type that surrounds a rotating shaft must function under the severest possible conditions to keep abrasive material out of the bearings.

In addition, the mounting of an auger shaft between a lower bearing in the bottom of a scraper bowl and drive connection on a motor shaft at the top of the scraper bowl requires precise alignment between the motor shaft and the bearing housing because of the need for precision mounting of the lower end of the auger shaft in the bearing.

Furthermore, auger scrapers may be used for loading coal, rock and rubble that includes stones of substantial size; and a rock which is large enough to jam between the lower end of the auger flight and the bearing can cause severe damage to one or more of the bearings, the auger or the drive means.

SUMMARY OF THE INVENTION

In accordance with the present invention, a support bearing assembly for an auger consists of a fixed lower housing secured to the floor of the scraper bowl and an upper housing which is rotatably mounted in bearings in the lower housing. A metal-to-metal seal is positioned between external flanges on the lower housing and the upper housing; and surrounding the metal-to-metal seal is a labyrinth seal. The rotatable upper housing provides a lubricant chamber, and the upper end of the housing is securely closed by a top plate which is surmounted by a square stub shaft.

The supporting bearing assembly includes both thrust bearings and lateral bearings, and the entire structure may be a precision made, prefabricated subassembly that is mounted on the floor of the scraper bowl.

The auger has a square socket in the lower end of its shaft which loosely but non-rotatably engages the square stub shaft on top of the sealed supporting bearing assembly; and at the upper end of the auger shaft is another square socket which loosely but non-rotatably engages a square stub at the bottom of the output shaft of a hydraulic motor.

The ends of the auger shaft may be relatively roughly finished because they do not rotatably engage any other element of the entire assembly; and this eliminates the costly machining of the lower end of an auger shaft which required when a shaft is rotatably supported in a bearing assembly.

The loose connections between the sockets in the ends of the auger shaft and the stub shaft eliminates any need for extremely precise alignment between the axis of the bearing assembly and the axis of the hydraulic motor output shaft, thus eliminating a difficult piece of precision fitting of components.

The length of the auger shaft is such that the auger may float up and down between the bearing assembly and the drive means while still maintaining the bottom and top slip connections. Thus, the auger has a non-rotatable, male and female slip connection at both ends, and also has substantial end play and a certain amount of said play. It has been found that a float of about an inch in the rotating auger, combined with a loose fit of the stub shafts in the sockets is sufficient to substantially reduce damage to the entire auger assembly due to the loading of large rocks or chunks of coal.

THE DRAWINGS

DETAILED DESCRIPTION OF THE INVENTION

Figure 1:
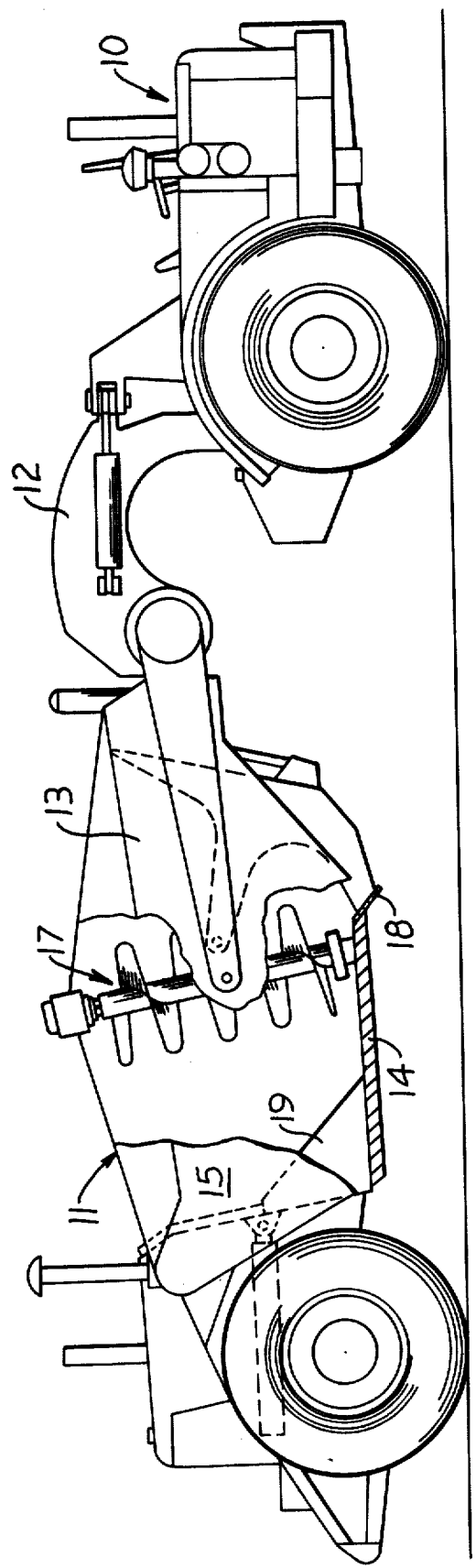
FIG. 1 is a side elevational view, with a part of the sidewall broken away, of an auger scraper embodying the invention.

Referring to FIG. 1, a self-loading auger scraper includes a tractor, indicated generally at 10, and a scraper, indicated generally at 11, which is articulately connected to the tractor by conventional gooseneck means 12. The scraper 11 includes a bowl 13 having a floor 14 and sidewalls 15, and a cross beam 16 between the upper ends of the sidewalls cooperates with the bowl floor 14 in mounting an auger assembly, which is indicated generally at 17 and has its lower end close to a forward cutting edge 18 of the bowl. The scraper is illustrated as provided with ejector means, indicated generally at 19, of the type disclosed and claimed in U.S. Pat. No. 3,863,367.

Figure 2:
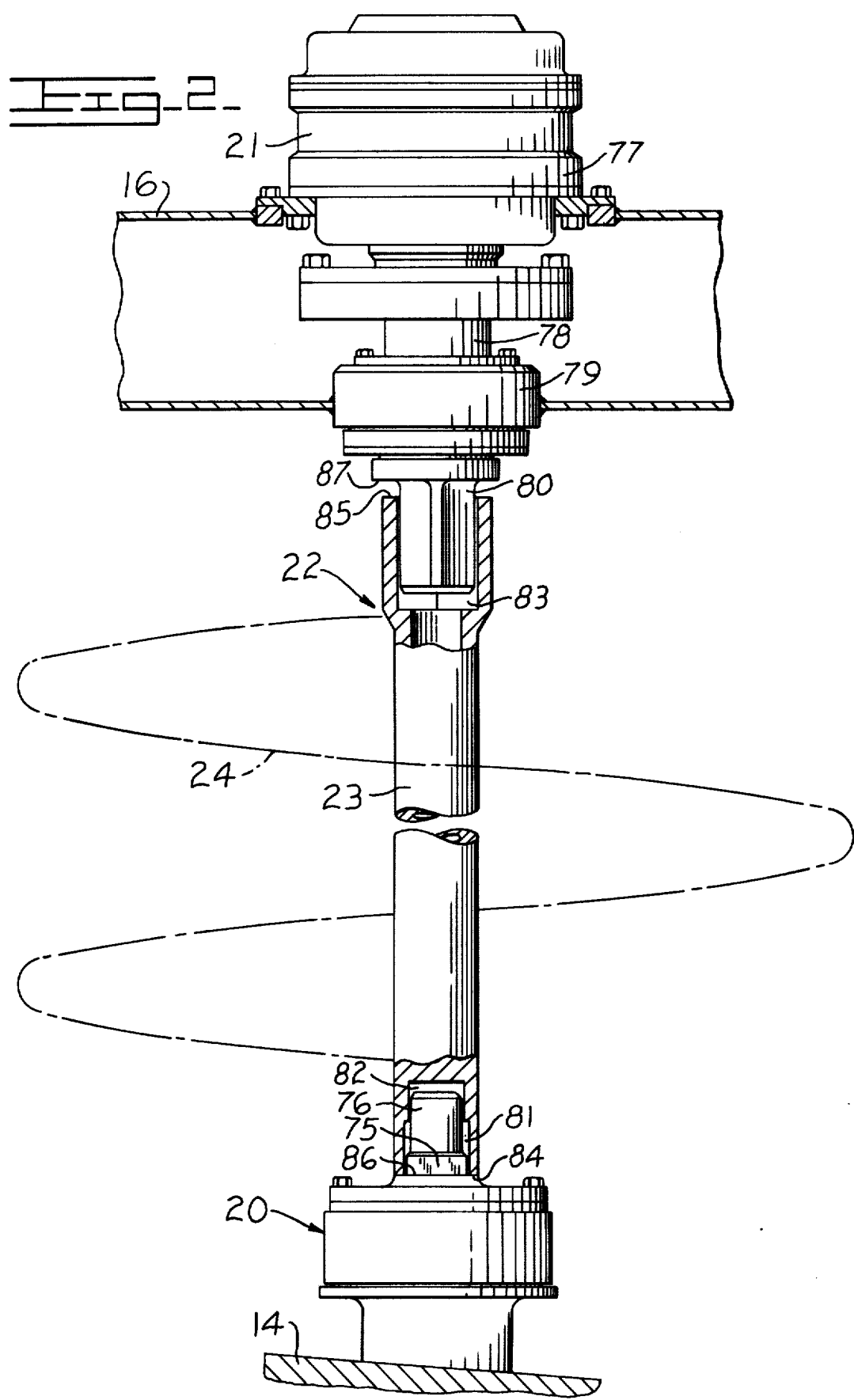
FIG. 2 is a fragmentary side elevational view on an enlarged scale, and partly in section, showing the mounting of the auger.

Referring now to FIG. 2, the auger assembly 17 consists generally of a supporting bearing assembly, indicated generally at 20, which is secured to the bowl floor 14; auger drive means 21 which is mounted upon the top cross beam 16; and an auger, indicated generally at 22, which includes a shaft 23 and the usual helical auger flight 24.

Figure 3:
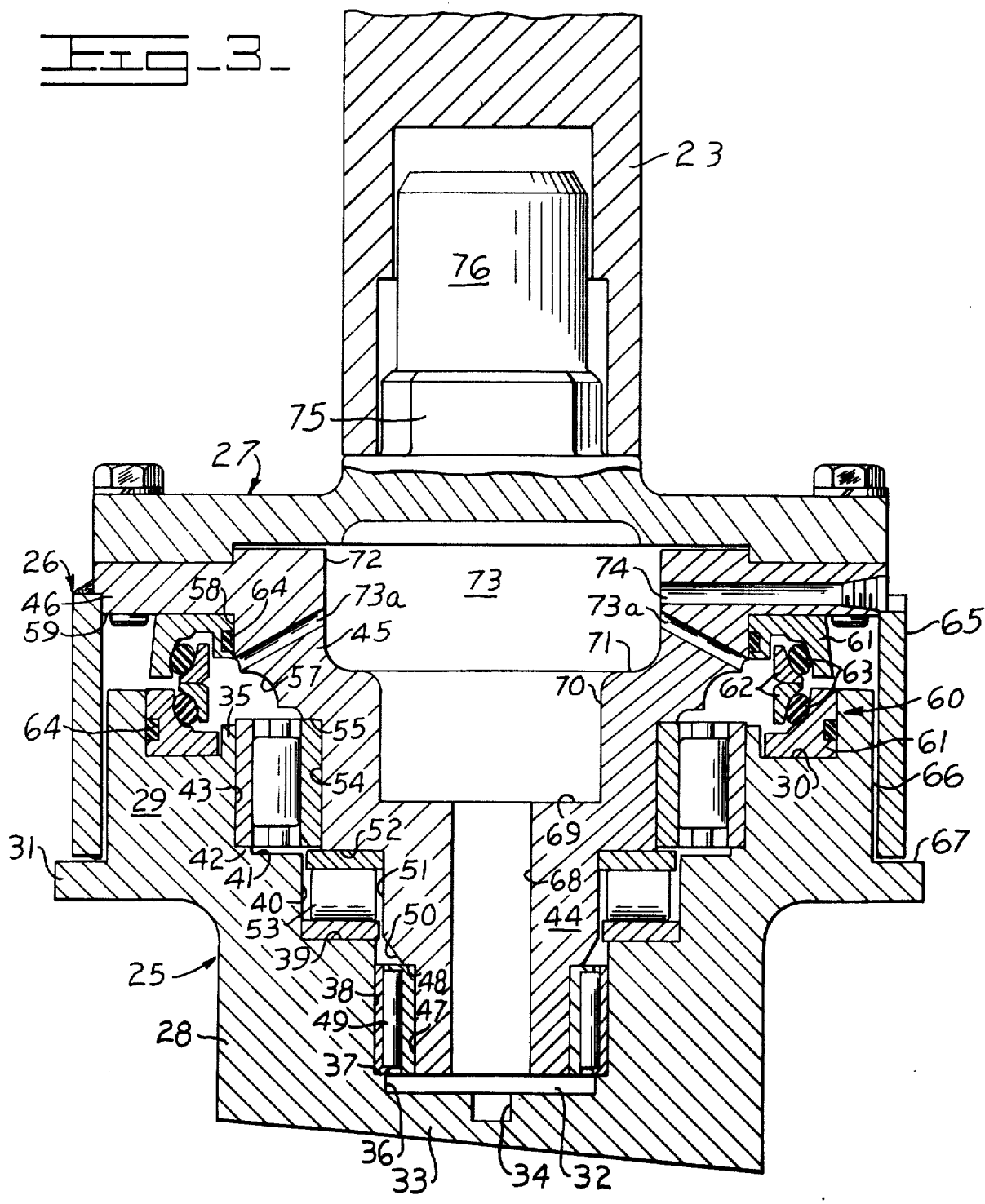
FIG. 3 is a fragmentary vertical sectional view on an enlarged scale to show the structure of the supporting bearing assembly for the auger.

Referring now to FIG. 3, the supporting bearing assembly 20 is seen to consist generally of a fixed lower bearing housing 25, a rotatable upper bearing housing 26, and a cover plate 27, for the rotatable upper bearing housing.

The lower bearing housing 25 has a base portion 28 and an external, annular top flange 29 the top surface of which is formed to provide a continuous channel 30. At the lower margin of the annular top flange 29 is a continuous radially projecting web 31.

Internally, the lower bearing housing 25 has a stepped cavity 32 which has a bottom wall 33 at the center of which is an axial bore 34 which extends nearly to the bottom surface of the base portion 28. The sidewall of the cavity 32 is formed in a series of annular steps so that it is of progressively increasing diameter from its bottom wall 33 to an upstanding circumferential web 35 which defines the inner wall of the channel 30, and the upper end of which defines the upper end of the cavity 32. The steps between the bottom wall 33 and the upstanding web 35 include a lowermost riser 36 that terminates at a transverse surface 37, a lower intermediate riser 38 which terminates in an intermediate transverse surface 39, an upper intermediate riser 40 which terminates in a transverse surface 41 at the outer periphery of which is a very shallow step 42 from which a cavity upper wall 43 extends upwardly and defines the inner surface of the upstanding web 35.

The rotatable upper bearing housing 26 has an externally and internally stepped bottom portion 44, the external steps of which are generally complementary to the internal steps of the lower housing cavity 32, and which cooperate with the risers and transverse surfaces of said cavity to define bearing raceways. The bottom portion 44 of the rotatable upper housing member is surmounted by an integral annular upper portion 45 which is surrounded by an external, annular upper flange 46 that confronts the top flange 29 when the upper and lower housing portions are assembled.

Specifically, the bottom portion 44 of the upper housing has a lowermost upright outer surface 47 which terminates in a transverse overhang 48. The surfaces 47 and 48 cooperate with the transverse surface 37 and the lower intermediate riser 38 to define a raceway for a roller bearing set 49. Above the overhang 48 is an inclined clearance surface 50 which merges into an intermediate lateral overhang 52. The surface 51 and the overhang 52 cooperate with the riser 40 and the transverse surface 39 to define a raceway for a set of thrust bearings 53.

At the outer margin of the overhang 52 is an uppermost, external upright surface 54 which terminates in a top overhang 55, and the surface 54 and overhang 55 cooperate with the cavity upper wall 43 and the shallow step 42 to provide a raceway for an upper bearing assembly 56 which is supported clear of the transverse surface 41 and the thrust bearing 53 by the shallow step 42. From the outer margin of the overhang 55 an arcuate clearance surface 57 extends outwardly and upwardly, and the overhanging upper portion 45 of the rotatable housing is spaced a substantial distance above the bearing assembly 56.

An outer upright surface 58 of the rotatable housing upper portion 45 cooperates with the bottom surface 59 of the upper flange 46 and with the channel 30 in the upper surface of the lower housing top flange 29 to receive an annular metal-to-metal seal structure, indicated generally at 60. The seal structure 60 is of the type disclosed in U.S. Pat. No. 3,180,648, owned by applicant's assignee. For purposes of the present disclosure it is sufficient to state that it consists of a pair of mounting shells 61, a pair of metal rings 62 which are in face abutting engagement to make the seal, and a pair of elastomeric rings 63 which are positioned between the shells 61 and the metal rings 62. The required metal-to-metal contact of the rings 62 may be obtained only by a downward force exerted upon the upper mounting shell 61 which compresses the elastomeric rings 63. The mounting shells 61 of the metal-to-metal seal assembly 60 are provided with recesses to receive O-ring seals 64.

At the outer periphery of the upper flange 46 is a depending annular skirt 65 which has a very small clearance from the outer surface 66 of the lower housing flange 29 and from the top surface 67 of the projecting web 31, so as to form a labyrinth seal with said surfaces.

The stepped interior of the upper housing member is a through bore which has a long, relatively small diameter lowermost bore portion 68 which terminates at a step that defines a transverse surface 69, and said transverse surface 69 terminates in another upright surface 70 at the top of which another transverse surface 71 defines the top of the upper housing bottom portion; and said transverse surface 71 cooperates with an upright inner surface 72 of the upper housing upper portion 45 to define a lubricant chamber 73 which communicates with the raceways through bores 73a. Initially the chamber 73 may be filled with lubricant before the cover plate 27 is secured in place; and in order to permit replenishment of the lubricant in the chamber 73 there is a lubricant fitting seated in the outer end of a bore 74 which extends through the upper flange 46. Surmounting the cover plate 27, and formed integrally with it, is a stub shaft 75 which is square in cross section. Atop the stub shaft is a short lead shaft 76 which is of a circular cross section less than the width of the square stub shaft.

The auger drive means 21 includes a hydraulic drive motor 77 which has a depending output shaft 78 which is journalled in an output shaft bearing assembly, indicated generally at 79, and said output shaft has at its outer end a stub portion 80 which is square in cross section and generally axially aligned with the stub shaft 75 of the supporting bearing assembly 20.

The auger shaft 23 has a square socket 81 formed at its bottom which loosely embraces the square stub shaft 75, and the bottom of the auger shaft 23 rests upon a planar surface of the cover plate 27 which surrounds the square stub 75. Above the bottom auger shaft socket 81 is a blind bore 82 which receives the lead shaft 76.

At the top of the auger shaft 23 is a top auger shaft socket 83 which is square in cross section and loosely embraces the square stub 80 at the lower end of the output shaft. Thus, the two ends of the auger shaft 23 make non-rotatable, male and female slip connections with the supporting bearing assembly 20 and the auger drive means 21. The lateral clearance between the square stub shafts 75 and 80 and the square sockets 81 and 83 is from about 1/16 inch to ⅛ inch.

The length of the auger shaft 23 from its bottom 84 to its top 85 is somewhat less than the distance from a surface 86 upon which the auger shaft rests to an annular surface 87 which surrounds the square stub 80 of the output shaft, so that the auger 22 is free to float vertically between the supporting bearing assembly 20 and the drive means 21. In practice, it has been found that if the lower square stub shaft 75 is about 1½ inches high and the length of the auger shaft 23 is about 1 inch less than the distance betwen the surfaces 86 and 87, the resulting 1 inch float of the auger is sufficient to greatly reduce the likelihood of damage to the auger assembly while still retaining the slip connection between the bottom auger shaft socket 81 and the bottom stub shaft 75. That amount of end play in the auger is also small enough that there is no possibility of damage to the supporting bearing assembly 20 if the auger flight 24 rides off of a rock under conditions where the auger can drop freely the 1 inch onto the cover plate 27.

Initial assembly, of course, requires that the bottom of the auger shaft 23 be seated upon the cover plate 27 with the auger 22 stably supported until the drive means 21 may be brought into driving engagement with the socket 83 in the upper end of the auger shaft 23 and the drive means may be secured to the top cross beam 16. The weight of the auger 22 resting upon the upper housing member 26 depresses said housing member to compress the elastomeric rings 63 of the seal 60 and thus close the seal across the metal rings 62.

The foregoing detailed description is given for clearness of understanding only and no unnecessary limitations should be understood therefrom, as modifications will be obvious to those skilled in the art.

What is claimed is:

1. An auger assembly for a self-loading auger scraper bowl, said assembly comprising, in combination:
   a supporting bearing assembly which includes a lower housing, thrust bearing means and lateral bearing means in said lower housing, an upper housing rotatably supported in said bearing means and closing the upper end of said bearing assembly, and annular lubricant sealing means between said housings, said bearing assembly being fixedly mounted at the bottom of the bowl,
   an auger having a shaft the lower end of which makes a non-rotatable male and female connection with the closed upper end of said bearing assembly;
   and a hydraulic motor mounted at the top of the bowl, said motor having an output shaft that makes a non-rotatable male and female connection with the upper end of said auger shaft.

2. The combination of claim 1 in which there is lateral play between the auger shaft and the supporting bearing assembly and the output shaft.

3. The combination of claim 2 in which there is substantial end play between the auger shaft, the supporting bearing assembly and the output shaft.

4. The combination of claim 1 in which the male and female connections are essentially square in cross-section.

5. The combination of claim 1 in which the lower connection includes an upright, non-circular mounting stub surmounting the support bearing and a complementary socket in the bottom of the auger shaft.

6. The combination of claim 1 in which the non-circular mounting stub is surmounted by a short lead shaft which is of a circular cross-section smaller than the shortest transverse dimension of said stub, and in which the complementary socket terminates in a bore which accommodates said lead shaft.

7. The combination of claim 5 in which the upper connection comprises a depending non-circular mounting stub and a complementary socket in the top of the auger shaft.

8. The combination of claim 1 in which the lower and upper housings have opposed peripheral flanges, and the annular sealing means is operatively associated with said flanges.

9. The combination of claim 8 in which the sealing means includes a metal-to-metal seal between the flanges and a labyrinth seal at the outer periphery of the flanges.

10. In a self-loading auger scraper which has an auger supporting bearing assembly mounted adjacent the floor of the scraper bowl, auger drive means supported at the top of the bowl, and an auger having a shaft mounted in a generally upright position between and connected to said supporting bearing and said drive means, the improvement comprising:
    a lower male and female non-rotating slip connection between the auger shaft and the supporting bearing, the auger resting on said supporting bearing;
    and an upper male and female non-rotating slip connection between the auger shaft and the drive means,
    the length of said auger shaft being so related to the space between the lower and upper connections that said auger may float while maintaining both of said slip connections.

11. The improvement of claim 10 in which the male and female connections are essentially square in cross-section.

12. The improvement of claim 10 in which the lower connection includes an upright, non-circular mounting stub surmounting the support bearing and a complementary socket in the bottom of the auger shaft.

13. The improvement of claim 12 in which the non-circular mounting stub is surmounting by a short lead shaft which is of a circular cross-section smaller than the shortest transverse dimension of said stub, and in which the complementary socket terminates in a bore which accommodates said lead shaft.

14. The improvement of claim 12 in which the upper connection comprises a depending non-circular mounting stub and a complementary socket in the top of the auger shaft.

15. The improvement of claim 10 in which each of the male and female slip connections provides substantial lateral movement between the male and female parts for ease of assembly and alignment of the auger with the supporting bearing and the drive means.

* * * * *